Dec. 6, 1955    A. G. JOHNSON    2,725,845
DIP GAUGE TUBE WITH DEFLECTOR
Filed Jan. 16, 1953
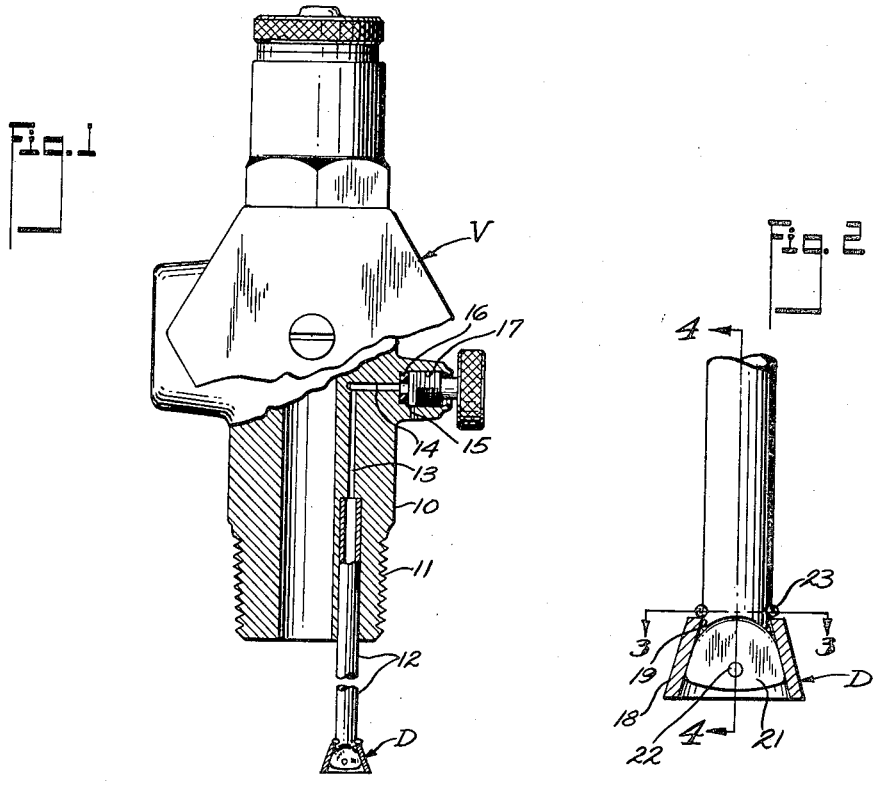
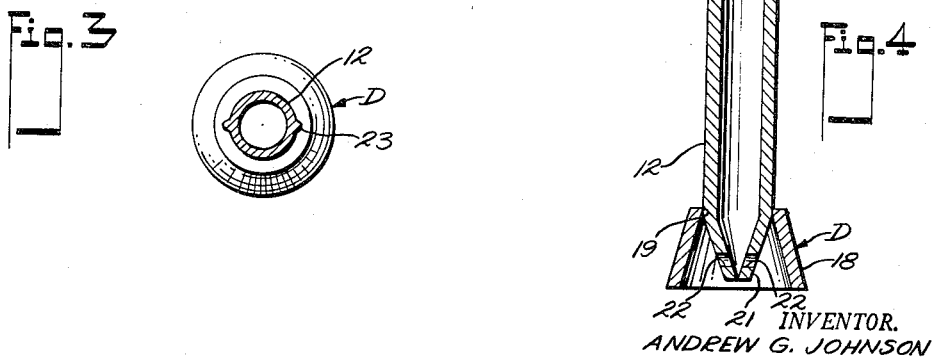
INVENTOR.
ANDREW G. JOHNSON
BY
RICHEY, WATTS, EDGERTON, & McNENNY
*J. W. Farrington*
ATTORNEYS United States Patent Office 2,725,845
Patented Dec. 6, 1955

2,725,845

DIP GAUGE TUBE WITH DEFLECTOR

Andrew G. Johnson, Lakewood, Ohio, assignor to The Weatherhead Company, Cleveland, Ohio, a corporation of Ohio Application January 16, 1953, Serial No. 331,565

2 Claims. (Cl. 116—118)

This invention relates to dispensing of liquefied petroleum gas and more particularly to a liquid level gauge tube for installation in such dispensing systems.

Liquefied petroleum gas is normally stored in pressure vessels which must be accurately filled from time to time. In general dip tubes are provided which extend downwardly into the pressure vessel with an end opening into the pressure vessel positioned at the desired liquid level within the vessel. In operation the dip tube encounters only gas until the level of the liquid within the vessel reaches the mouth of the tube at which time the liquid flows up through the tube thereby indicating that the vessel is properly filled. Difficulties have been encountered due to false readings caused by splashing of the liquid which causes drops of liquid to enter the end of the dip tube. Various attempts at solving this problem have utilized deflectors and the like in the attempt to eliminate the entry of drops of liquid into the dip tube. However, these solutions have, for the most part, involved either elaborate and expensive structure or have been ineffective in preventing any drops of liquid from entering the mouth of the dip tube.

It is an important object of this invention to provide a simple economical structure effective in preventing false liquid level readings caused by the entry of drops of liquid into the dip tube.

Another object of this invention is to provide a dip tube structure which results in vaporization in any stray drops of liquid entering the mouth of the dip tube thereby preventing any false indications of liquid level within a pressure vessel.

The foregoing and other objects and advantages will become apparent in view of the following description taken in conjunction with the drawings, wherein:

Fig. 1 is a side view partially in section showing a dip tube according to this invention as applied to a typical pressure vessel valve;

Fig. 2 is an enlarged, partially in cross section, view showing a preferred structure of a dip tube according to this invention;

Fig. 3 is a side view in cross section showing the preferred structure of a dip tube according to this invention; and, Fig. 4 is a plan view of the dip tube deflector.

In a preferred embodiment of this invention a dip tube is fabricated by compressing the sides of the mouth of the dip tube closing the end thereof, drilling a radial hole through the two sides of this flattened portion of the dip tube and slipping the sheet metal deflecting skirt over the tube which prevents splashing of the liquid against the end of the tube and serves as a drip ledge during the filling operation.

Referring to the drawings, Fig. 1 shows a valve V which is used for filling and dispensing liquefied petroleum gas adapted to be mounted on a pressure vessel. The valve includes a nipple 10 threaded as at 11 for mounting in a pressure vessel (not shown). It has fastened therein a gauge or dip tube 12 which communicates through bores 13 and 14 formed in the valve body with a bleed port 15 through a perforated sealing washer 16 confined in a bore 17 in the valve body. The deflector D is in the form of a cone-like sheet metal member having a skirt portion 18 and a bore 19 that passes over the end of the tube 12. The end of the tube 12 is compressed or flattened as at 21 thereby closing off the mouth or end of the tube. Small radial passages 22 are formed in the flattened portion of the tube 12 and provide fluid communication with the bore of the tube 12. The passages 22 are axially aligned so that liquid or vapor entering the tube 12 through one of the passages impinges upon the liquid or vapor entering the other passage. It is apparent that the passages will readily pass vapor and will also pass liquid when submerged in the liquid with a vapor pressure existing above the level of the liquid. However, stray drops not deflected by the skirt 18 that enter one of the passages 22 will impinge upon the stream of vapor entering the other passage with the result that the liquid is atomized and vaporized thereby preventing false indications of liquid level within the pressure vessel.

The compressing and flattening of the end of the tube 12 results in a flaring on which the deflector D rests thereby preventing the deflector from slipping off the end of the tube. The deflector may be restrained against sliding in the upward direction as desired by pinching the tube as at 23 thereby securely holding the deflector in place without requiring soldering, brazing or threading operations.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

I claim:

1. A fill gauge for determining the level of liquid in a liquified petroleum gas container comprising a vertically disposed elongated tube having its upper end in communication with the exterior of the container and the lower extremity thereof being closed by having the sides thereof pinched tightly together, the lower end of the tube being provided with a pair of axially aligned openings adjacent to and immediately above the pinched lower extremity of the tube, said openings being in axial alignment with each other and on opposite sides of the pinched lower extremity of the tube whereby a drop of liquid entering the tube through one opening is impinged upon and is vaporized by a jet of vapor entering the tube through the opening on the other side thereof and a skirt-like deflector member connected at its upper end to the tube above said openings and having its lower end disposed below the openings to provide a mouth of substantially greater diameter than the diameter of the tube.

2. A fill gauge for determining the level of liquid in a liquified petroleum gas container comprising a vertically disposed tube in communication at its upper end with the exterior of the container, the lower end of said tube being closed by bringing the side walls of the tube at its lower end into tight engagement, said lower end having a pair of axially aligned openings through opposite side walls immediately adjacent the closed lower end whereby a drop of liquid entering the tube through one of said openings is impinged upon and vaporized by a jet of gas entering the tube through the other opening and a conical deflector secured to the tube at the lower end thereof above said openings in the side walls, the lower edge of the conical deflector depending beneath said openings in the tube and providing an inlet mouth of greater diameter than the diameter of the tube.

References Cited in the file of this patent

UNITED STATES PATENTS

| 494,467 | Donathen | Mar. 28, 1893 |
| 2,440,230 | Buttner | Apr. 20, 1948 |
| 2,677,345 | Baldwin | May 4, 1954 |